United States Patent [19]

Watanabe et al.

[11] Patent Number: 4,968,727
[45] Date of Patent: Nov. 6, 1990

[54] PRIMER COMPOSITION

[75] Inventors: Junichiro Watanabe; Makoto Sawada, both of Gunma, Japan

[73] Assignee: Toshiba Silicone Co., Ltd., Tokyo, Japan

[21] Appl. No.: 461,856

[22] Filed: Jan. 8, 1990

[30] Foreign Application Priority Data

Jan. 9, 1989 [JP] Japan ........................... 1-1154

[51] Int. Cl.$^5$ ............................................. C08K 9/06
[52] U.S. Cl. ............................... 523/212; 523/213; 524/188; 524/225; 524/356; 524/315; 524/378
[58] Field of Search ............... 524/188, 225, 356, 315, 524/378; 523/212, 213

[56] References Cited

U.S. PATENT DOCUMENTS 4,400,482  8/1983  Close ................................. 524/188
4,918,126  4/1990  Matsushita et al. ................. 524/188

Primary Examiner—Melvyn I. Marquis
Assistant Examiner—Karen A. Hellender
Attorney, Agent, or Firm—Sughrue, Mion, Zinn, Macpeak & Seas

[57] ABSTRACT

A primer composition which is particularly effective to strongly bond fluorosilicone rubbers to metal, plastics, fibers, and the like, comprising (A) 100 parts by weight of a polyorganosiloxane represented by formula (I):

$$(R^1)_a SiO_{\frac{4-a}{2}} \quad (I)$$

wherein $R^1$ represents a substituted or unsubstituted monovalent hydrocarbon group, 10 to 50 mol % of the hydrocarbon groups of $R^1$ being perfluoroalkyl and 0.01 to 1.0 mol % of the hydrocarbon groups of $R^1$ being vinyl, and a is a number of from 1.98 to 2.01, and which has a viscosity as measured at 25° C. of 1,000,000 cSt or more;

(B) 5 to 100 parts by weight of a silica filler;

(C) 0.5 to 50 parts by weight of a compound represented by formula (II):

$$\begin{matrix} & R & O & \\ & | & \| & \\ (CH_2= & C- & C- & NH)_{\overline{n}} X \end{matrix} \quad (II)$$

wherein X represents an organosilicon-containing group or a hydrocarbon-containing group, R represents methyl or hydrogen, and n is an integer of 1 or larger; and (D) an organic solvent.

12 Claims, No Drawings

PRIMER COMPOSITION

FIELD OF THE INVENTION

The present invention relates to a primer composition which is particularly effective in strongly bonding fluorosilicone rubbers to metals, plastics, fibers, and the like, and enables vulcanization-bonding of fluorosilicone rubbers to those materials, which is conducted even by hot-air vulcanization at ordinary pressure to complete strong bonding, without the necessity of high pressure as in press vulcanization.

BACKGROUND OF THE INVENTION

Fluorosilicone rubbers have excellent heat resistance, low-temperature resistance, chemical resistance, and other properties and are used in various fields. However, since fluorosilicone rubbers have poor bondability to metals, plastics, and the like, their uses in composite structures with these materials have been limited.

In order to overcome the above problem, it has been proposed to subject the surfaces of metals, plastics, and the like to primer treatment so as to a strongly bond fluorosilicone rubbers to these materials or to form fluorosilicone rubber coatings strongly adhering to those materials. For this purpose, various primer compositions have so far been proposed.

Known primer compositions of this kind include those disclosed in JP-B-53-14580 and JP-A-59-182865. (The terms "JP-B" and "JP-A" as used herein mean an "examined Japanese patent publication" and an "unexamined published Japanese patent application", respectively.) These primer compositions, however, are defective in that for obtaining sufficient adhesion-improving effects with these primer compositions, the fluorosilicone rubber should be heat-pressed to adherends for a long period of time at high temperature and pressure, because they are almost ineffective when used in hot-air vulcanization bonding under ordinary pressure. Further, the bonding of fluorosilicone rubbers to plastics such as nylon and polyethylene terephthalate cannot be sufficiently improved by the above-proposed primer compositions.

SUMMARY OF THE INVENTION

Accordingly, an object of the present invention is to provide a primer composition with which fluorosilicone rubbers can be strongly bonded to metals, plastics, fibers, and other substances by either of press vulcanization or ordinary pressure hot-air vulcanization, thus eliminating the disadvantages described above.

DETAILED DESCRIPTION OF THE INVENTION

The primer composition of the present invention comprises:

(A) 100 parts by weight of a polyorganosiloxane represented by the formula (I):

wherein $R^1$ represents a substituted or unsubstituted monovalent hydrocarbon group, 10 to 50 mol% of the hydrocarbon groups of $R^1$ being perfluoroalkyl and 0.01 to 10 mol% of the hydrocarbon groups of $R^1$ being vinyl, and a is a number of from 1.98 to 2.01, and which has a viscosity as measured at 25° C. of 1,000,000 cSt or more;

(B) 5 to 100 parts by weight of a silica filler;

(C) 0.5 to 50 parts by weight of a compound represented by the formula (II):

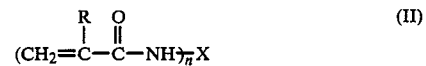

wherein X represents an organosilicon-containing group or a hydrocarbon-containing group, R represents methyl or hydrogen, and n is an integer of 1 or larger; and (D) an organic solvent.

The polyorganosiloxane used as component (A) in this invention serves to improve particularly the adhesion of fluorosilicone rubbers to primer layers in the bonding of fluorosilicone rubbers to metals, plastics, or fibers, and also to improve the coating properties and storage stability of the primer composition.

In the above-described formula (I), $R^1$ represents a substituted or unsubstituted monovalent hydrocarbon group, and examples thereof include an alkyl group such as methyl, ethyl, propyl or butyl; an aryl group such as phenyl or tolyl; an aralkyl group such as β-phenylethyl; a vinyl group; or those groups wherein part or whole of hydrogen atoms are substituted with a halogen atom, such as 3,3,3-trifluoropropyl or 3-chloropropyl. Of the $R^1$ groups in the formula (I), 10 to 50 mol% and preferably 20 to 50 mol% should be a perfluoroalkyl group, such as 3,3,3-trifluoropropyl or 3,3,4,4,4-pentafluorobutyl, and 0.01 to 10 mol% and preferably 0.1 to 3 mol% should be a vinyl group. The reasons for this are as follows. If the percentage of perfluoroalkyl groups is below 10 mol%, the adhesion between primer and fluorosilicone rubber is poor, while even if the percentage thereof exceeds 50 mol%, the adhesion between primer and fluorosilicone rubber cannot be improved any more, and also such a high percentage results in a disadvantage of high cost. Further, if the percentage of vinyl groups which serve to chemically bond fluorosilicone rubber to a primer layer in the organic peroxide vulcanization or addition reaction vulcanization of the fluorosilicone rubber is below 0.01 mol%, almost no chemical bonds are formed between the fluorosilicone rubber and the primer layer, resulting in poor adhesion. On the other hand, if the percentage thereof exceeds 10 mol%, the heat resistance of the resulting primer composition is impaired.

Further, the polyorganosiloxane, component (A), should have a viscosity as measured at 25° C. of 1,000,000 cSt or more and preferably 2,000,000 to 7,000,000 cSt. This is because a viscosity below 1,000,000 cSt impairs the air-drying properties of the primer composition and makes primer layers tacky.

The silica filler, component (B), used in this invention serves to impart strength to a primer film and improve the adhesion properties of the primer composition.

Examples of component (B) include reinforcing silicas having a specific surface area of 50 m²/g or more, such as fumed silica, precipitated silica, calcined wet-process silica, and silica aerogel, and non-reinforcing silicas, such as ground quartz and diatomaceous earth. The silica filler may be used as it is, or may be used after being made hydrophobic by treatment with a surface-treating agent such as an organosilane, a polydiorganosiloxane, or a hexaorganodisilazane.

The amount of component (B) added to the primer composition is from 5 to 100 parts by weight and preferably 10 to 50 parts by weight per 100 parts by weight of component (A). If the amount added thereof is below 5 parts by weight, not only can the primer composition not give a primer layer having sufficient film strength, but the adhesion properties of the primer composition are impaired. If the amount thereof exceeds 100 parts by weight, the primer composition has poor storage stability.

The compound of the formula (II) used as component (C) in this invention contributes to an improvement in the adhesion properties of the primer composition Examples of component (C) include N-methylolacrylamide, N,N'-dimethylacrylamide, diacetone acrylamide, N,N-methylenebisacrylamide, N-methylolmethacrylamide, (N-methacryl)-γ-aminopropyltrimethoxysilane,

and partial condensates of these alkoxysilanes. A combination of two or more of these compounds may be used as component (C).

The amount of component (C) added is from 0.5 to 50 parts by weight and preferably 2 to 30 parts by weight per 100 parts by weight of component (A). If the amount of component (C) is below 0.5 part by weight, the adhesion properties cannot be improved sufficiently, while an amount thereof exceeding 50 parts by weight impairs the air-drying properties and storage stability of the primer composition.

The organic solvent, component (D), used in this invention is a solvent which can dissolve or disperse components (A) to (C). Component (D) serves to impart an adequate viscosity to the primer composition, thus enabling easy coating operations.

As component (D), a solvent having good compatibility with each of ingredients (A) to (C) can be used. Examples thereof include acetone, ethyl acetate, butyl acetate, cyclohexanone, tetrahydrofuran, methyl ethyl ketone, and methyl isobutyl ketone.

The amount of component (D) added is not particularly limited. In general, however, the amount is preferably 200 to 800 parts by weight per 100 parts by weight of component (A).

As described above, the primer composition of this invention comprises the four components of (A) to (D). Besides these essential components, other materials such as inorganic fillers, pigments, silane coupling agents, and organic peroxides may also be suitably added to the primer composition so long as they do not impair the object of the invention.

The primer composition of this invention can be applied on the surfaces of various base materials to be bonded to fluorosilicone rubbers by coating the primer composition on the surfaces or dipping the base materials in the primer composition. The thus-applied primer composition is then air-dried at room temperature for about 30 to 60 minutes, so that the resulting primed base materials can be subjected to molding. Further, by baking the applied primer composition at a temperature of 150 to 250° C for about 1 to 60 minutes, primer films having excellent strength can be formed without impairing the adhesion strength thereof, whereby the flow of primer layers can be prevented.

By using the primer composition of this invention, fluorosilicone rubbers can be strongly bonded to adherends such as metals, plastics, rubbers, and fibers by means of ordinary pressure hot-air vulcanization as well as usually employed press vulcanization.

The primer composition of this invention can be advantageously used as a primer for use in the production of composite oil seals and gaskets for automobiles, the bonding of fluorosilicone rubbers to other organic compounds in producing diaphragms, and the production of parts comprising rubbers, plastics, metals, etc., covered or coated with fluorosilicone rubbers.

The present invention will be explained in more detail by reference to the following Examples and Comparative Examples. In the Examples and Comparative Examples, all parts are by weight.

EXAMPLE 1

Into a kneader was introduced 100 parts of trimethylsilyl-terminated poly[methyl(3,3,3-trifluoropropyl)-siloxane] composed of 98 mol% of methyl(3,3,3-trifluoropropyl)siloxane units and 2.0 mol% of methylvinylsiloxane units and having a viscosity as measured at 25° C. of 5,000,000 cSt. 20 Parts of fumed silica which had been surface-treated with tri[methyl(3,3,3-trifluoropropyl)]cyclotrisiloxane and having a specific surface area of 200 m²/g was then added thereto. The resulting mixture was kneaded until it became uniform. The thus-obtained compound is called Compound A.

120 Parts of Compound A was dissolved in 600 parts of ethyl acetate. To 720 parts of the resulting ethyl acetate solution was added 2 parts of the acrylamide group-containing compound as shown in Table 1. The resulting mixture was stirred until it became uniform, thereby giving a primer composition.

A nylon woven fabric and a polyethylene terephthalate woven fabric were immersed in the above-obtained primer composition, taken out therefrom, and then air-dried at room temperature for 60 minutes. Subsequently, a fluorosilicone rubber compound prepared by blending 100 parts of fluorosilicone rubber FQE26U [trade name of a polyorganosiloxane containing 97 mol% or more of methyl(3,3,3-trifluoropropyl)siloxane units; manufactured by Toshiba Silicone Co., Ltd., Japan] with 1 part of 2,4-dichlorobenzoyl peroxide was superimposed on one side of each of the above-obtained primed woven fabrics at a thickness of 3 mm. The resulting assemblies were heated in an oven at 150° C. for 20 minutes for cure-bonding, and then cut into test pieces of 25.0 mm in width and 120 mm in length.

The peel adhesion strength thereof was measured in accordance with JIS K 6301, and the results obtained are shown in Table 1.

After the peel test, the appearance of each test piece was visually evaluated and the results are also shown in Table 1, in which a rubber cohesive failure of 80 to 100%, 50 to 80%, and below 50% are denoted by o, Δ and x, respectively. The conditions for the above peel test were as follows.

| Testing machine | Autograph (manufactured by Shimadzu Corporation, Japan) |
|---|---|
| Crosshead speed | 50 mm/min |
| Temperature | 25° C. |

In the above procedures, the state of the 60 minute air-dried primer composition applied on the fabrics was also evaluated by touching. The evaluation results are shown in Table 1, in which o denotes "tack-free", Δ "slightly tacky", and x "tacky one".

In Table 1 and Tables 2 and 3 given later, the figures indicating the amount of the components are "parts".

EXAMPLES 2 TO 4

Using the same Compound A as used in Example 1 and ethyl acetate, primer compositions were obtained in the same manner as in Example 1 except that the amount of the acrylamide group-containing compound was changed to 5 parts (Example 2), 10 parts (Example 3), and 30 parts (Example 4).

Under the same conditions as in Example 1, peel test pieces of the same structure and size were prepared using the above-obtained primer compositions. These test pieces were subjected to measurement of the peel adhesion strength and evaluated for appearance after peeling, and further the air-drying properties of the primer compositions were evaluated, under the same conditions as in Example 1.

The composition of each primer composition and the results obtained are shown in Table 1.

COMPARATIVE EXAMPLE 1

In 600 parts of ethyl acetate was dissolved 120 parts of the same Compound A as used in Example 1. The resulting mixture was stirred until it became uniform, thereby giving a primer composition. Under the same conditions as in Example 1, peel test pieces of the same structure and size were prepared using the above-obtained primer composition. These test pieces were subjected to measurement of the peel adhesion strength and evaluated for appearance after peeling, and further the air-drying properties of the primer composition were evaluated under the same conditions as in Example 1.

The composition of the primer composition and results obtained are shown in Table 1.

dimethylsiloxane units and having a viscosity as measured at 25° C. of 7,000,000 cSt. 20 Parts of fumed silica which had been surface-treated with octamethylcyclotetrasiloxane and having a specific surface area of 130 $m^2/g$ was added thereto. The resulting mixture was kneaded until it became uniform, thereby obtaining a compound.

120 Parts of this compound was dissolved in 600 parts of ethyl acetate. To 720 parts of the resulting ethyl acetate solution was added 5 parts of the same acrylamide group-containing compound as used in Example 1. The resulting mixture was stirred until it became uniform, thereby giving a primer composition. The composition of this primer composition is shown in Table 2.

The above-obtained primer composition was applied on a nylon woven fabric in the same manner as in Example 1, and then air-dried for 60 minutes. Subsequently, a fluorosilicone rubber compound (35 mm in diameter and 5 mm in thickness) prepared by blending 100 parts of fluorosilicone rubber FQE24U (trade name, manufactured by Toshiba Silicone Co., Ltd.) with 0.5 part of 2,5-dimethyl-2,5-di(t-butylperoxy)hexane was superimposed tightly on the above-obtained primed nylon woven fabric. The resulting assembly was subjected to press vulcanization for 10 minutes at a pressure of 30 $kg/cm^2$ and a temperature of 170° C., whereby the rubber was cured and bonded to the adherend. Thus, there was obtained a test piece for measurement of the adhesion strength between the vulcanized rubber and the nylon woven fabric. In total, 4 test pieces of the same structure and size were prepared under the same conditions.

The adhesion strength of these test pieces was measured in accordance with JIS K 6301, and the results obtained are shown in Table 2. The conditions for the adhesion strength measurement were as follows.

| Testing machine | Autograph (manufactured by Shimadzu Corporation) |

TABLE 1

| | | | Example | | | | Comparative |
|---|---|---|---|---|---|---|---|
| | | | 1 | 2 | 3 | 4 | Example 1 |
| (A) | Compound of formula (I) Poly[methyl(3,3,3-trifluoropropyl)siloxane]*1 | | 100 | 100 | 100 | 100 | 100 |
| (B) | Silica filler Surface-treated fumed silica*2 | | 20 | 20 | 20 | 20 | 20 |
| (C) | Compound of formula (II) $(CH_2=CHCNH)_2CH_2$ $\parallel$ O | | 2 | 5 | 10 | 30 | 0 |
| (D) | Organic solvent ethyl acetate | | 600 | 600 | 600 | 600 | 600 |
| | Peel adhesion strength (kgf/cm) | Nylon | 1.0 | 1.5 | 2.1 | 2.0 | 0.05 |
| | | Polyethylene terephthalate | 1.2 | 1.7 | 1.9 | 1.8 | 0.10 |
| | Appearance after peeling | Nylon | Δ | o | o | o | x |
| | | Polyethylene terephthalate | o | o | o | o | x |
| | Air-drying property of primer | | o | o | o | o | |

*1containing 2.0 mol % methylvinylsiloxane units.
*2surface-treated with tri[methyl(3,3,3-trifluoropropyl)]cyclotrisiloxane; specific surface area 200 $m^2/g$.

EXAMPLE 5

Into a kneader was introduced 100 parts of a trimethylsilyl-terminated methyl(3,3,3-trifluoropropyl) siloxane-dimethylsiloxane copolymer composed of 75 mol% of methyl(3,3,3-trifluoropropyl)siloxane units, 0.3 mol% of methylvinylsiloxane units, and 24.7 mol% of

| Crosshead speed | 25 mm/min |
| Temperature | 25° C. |

EXAMPLE 6

Into a kneader was introduced 100 parts of a trimethylsilyl-terminated methyl(3,3,3-trifluoropropyl)-siloxane-dimethylsiloxane copolymer composed of 50 mol% of methyl(3,3,3-trifluoropropyl)siloxane units, 0.3 mol% of methylvinylsiloxane units, and 49.7 mol% of dimethylsiloxane units and having a viscosity as measured at 25° C. of 2,000,000 cSt. 20 Parts of the same fumed silica as used in Example 5 was then added thereto. The resulting mixture was kneaded until it became uniform, thereby obtaining a compound.

120 Parts of this compound was dissolved in 600 parts of ethyl acetate. To 720 parts of the resulting ethyl acetate solution was added 5 parts of the same acrylamide group-containing compound as used in Example 5. The resulting mixture was stirred until it became uniform, thereby giving a primer composition. The composition of this primer composition is shown in Table 2.

Under the same conditions as in Example 5, test pieces of the same structure and size for adhesion strength measurement were prepared using the above-obtained primer composition. These test pieces were subjected to adhesion strength measurement under the same conditions as in Example 5. The results obtained are shown in Table 2.

COMPARATIVE EXAMPLE 2

Into a kneader was introduced 100 parts of trimethylsilyl-terminated polydimethylsiloxane composed of 0.3 mol% of methylvinylsiloxane units and 99.7 mol% of dimethylsiloxane units and having a viscosity as measured at 25° C. of 4,000,000 cSt. 20 Parts of the same fumed silica as used in Example 5 was then added thereto. The resulting mixture was kneaded until it became uniform, thereby obtaining a compound.

120 Parts of this compound was dissolved in 600 parts of ethyl acetate. To 720 parts of the resulting ethyl acetate solution was added 5 parts of the same acrylamide group-containing compound as used in Example 5. The resulting mixture was stirred until it became uniform, thereby giving a primer composition. The composition of this primer composition is shown in Table 2.

Under the same conditions as in Example 5, test pieces of the same structure and size for adhesion strength measurement were prepared using the above-obtained primer composition. These test pieces were subjected to adhesion strength measurement under the same conditions as in Example 5. The results obtained are shown in Table 2.

TABLE 2

|     |                                                                         | Example 5 | Example 6 | Comparative Example 2 |
| --- | ----------------------------------------------------------------------- | --------- | --------- | --------------------- |
| (A) | Compound of formula (I)                                                 |           |           |                       |
|     | Methyl(3,3,3-trifluoropropyl) siloxane dimethylsiloxane copolymer       | 100*3     | 100*4     | —                     |
|     | Dimethylpolysiloxane*5                                                  | —         | —         | 100                   |
| (B) | Silica filler Surface-treated fumed silica*6                            | 20        | 20        | 20                    |
| (C) | Compound of formula (II) $(CH_2=CHCNH)_2CH_2$ $\quad\ \ \ \|$ $\quad\ \ \ O$ | 5         | 5         | 5                     |
| (D) | Organic solvent ethyl acetate                                           | 600       | 600       | 600                   |
|     | Adhesion strength (kgf/cm²)                                             | 1.8       | 1.4       | 0.3                   |

*3 consisting of 75 mol % methyl(3,3,3-trifluoropropyl)siloxane units, 24.7 mol % dimethylsiloxane units, and 0.3 mol % methylvinylsiloxane units.
*4 consisting of 50 mol % methyl(3,3,3-trifluoropropyl)siloxane units, 49.7 mol % dimethylsiloxane units, and 0.3 mol % methylvinylsiloxane units.
*5 containing 0.3 mol % methylvinylsiloxane units.
*6 surface-treated with octamethylcyclotetrasiloxane; specific surface area 130 m²/g.

EXAMPLE 7

Into a kneader was introduced 100 parts of trimethylsilyl-terminated poly[methyl(3,3,3-trifluoropropyl)-siloxane] composed of 95 mol% of methyl(3,3,3-trifluoropropyl)siloxane units and 5 mol% of methylvinylsiloxane units and having a viscosity as measured at 25° C. of 6,000,000 cSt. 10 Parts of the same fumed silica as used in Example 1 was then added thereto. The resulting mixture was kneaded until it became uniform, thereby obtaining a compound.

110 Parts of the thus-obtained compound was dissolved in 400 parts of methyl ethyl ketone. To 510 parts of the resulting methyl ethyl ketone solution was added 5 parts of the acrylamide group-containing compound as shown in Table 3. The resulting mixture was stirred until it became uniform, thereby giving a primer composition.

Under the same conditions as in Example 1, peel test pieces of the same structure and size were prepared using the above-obtained primer composition. These test pieces were subjected to measurement of the peel adhesion strength and evaluated for appearance after peeling, and further the air-drying properties of the primer composition were evaluated under the same conditions as in Example 1.

The composition of the primer composition and results obtained are shown in Table 3.

EXAMPLES 8 AND 9

Using the same poly[methyl(3,3,3-trifluoropropyl)-siloxane] and acrylamide group-containing compound as used in Example 7 and also using methyl ethyl ketone, two primer compositions were obtained in the same manner as in Example 7 except that the amount of the fumed silica was changed to 25 parts (Example 8) and 50 parts (Example 9), respectively.

Under the same conditions as in Example 7, peel test pieces of the same structure and size were prepared using the above-obtained primer compositions. These test pieces were subjected to measurement of the peel adhesion strengths and evaluated for appearance after peeling, and further the air-drying properties of the primer compositions were evaluated, under the same conditions as in Example 7. The composition of each primer composition and results obtained are shown in Table 3.

COMPARATIVE EXAMPLE 3

100 Parts of the same poly[methyl(3,3,3-trifluoropropyl)siloxane] as used in Example 7 was dissolved in 400 parts of methyl ethyl ketone. To 500 parts of the resulting methyl ethyl ketone solution was added 5 parts of the same acrylamide group-containing compound as used in Example 7. The resulting mixture was stirred until it became uniform, thereby obtaining a primer composition.

Under the same conditions as in Example 7, peel test pieces of the same structure and size were prepared using the above-obtained primer composition. These test pieces were subjected to measurement of the peel adhesion strength and evaluated for appearance after peeling, and further the air-drying properties of the primer composition were evaluated, under the same conditions as in Example 7. The composition of the primer composition and results obtained are shown in Table 3.

position was changed to 0.1 part. The results obtained are shown in Table 4.

TABLE 4

|  | Example | | Comparative Example | |
|---|---|---|---|---|
|  | 10 | 11 | 4 | 5 |
| Metal plate | SUS304 | aluminum | SUS304 | aluminum |
| Adhesion strength (kgf/cm$^2$) | 13.2 | 7.8 | 1.5 | 0.2 |

TABLE 3

|  |  |  | Example | | | Comparative Example 3 |
|---|---|---|---|---|---|---|
|  |  |  | 7 | 8 | 9 |  |
| (A) | Compound of formula (I) Poly[methyl(3,3,3-trifluoropropyl)siloxane]*[1] | | 100 | 100 | 100 | 100 |
| (B) | Silica filler Surface-treated fumed silica*[2] | | 10 | 25 | 50 | 0 |
| (C) | Compound of formula (II) $(CH_2=CHCNH)_2CH_2$ $\parallel$ O | | 5 | 5 | 5 | 5 |
| (D) | Organic solvent Methyl ethyl ketone | | 400 | 400 | 400 | 400 |
| Peel adhesion strength (kgf/cm) | | Nylon | 1.2 | 2.0 | 2.3 | 0.2 |
| | | Polyethylene terephthalate | 1.2 | 1.9 | 2.2 | 0.3 |
| Appearance after peeling | | Nylon | Δ | o | o | x |
| | | Polyethylene terephthalate | Δ | o | o | x |
| Air-drying property of primer | | | Δ | o | o | x |

*[7] containing 5.0 mol % methylvinylsiloxane units.
*[8] surface-treated with tri[methyl(3,3,3-trifluoropropyl)]cyclotrisiloxane: specific surface area 200 m$^2$/g.

EXAMPLES 10 AND 11

Into a kneader was introduced 100 parts of the same poly[methyl(3,3,3-trifluoropropyl)siloxane] as used in Example 7. 25 Parts of fumed silica having a specific surface area of 200 m$^2$/g and 5 parts of (N-methacryl)-γ-aminopropyltrimethoxysilane as an acrylamide group-containing compound was added thereto. The resulting mixture was kneaded until it became uniform, thereby obtaining a compound.

130 Parts of this compound was dissolved in 600 parts of ethyl acetate to give a primer composition.

The thus-obtained primer composition was coated on a plate of stainless steel SUS 304 and an aluminum plate, and then air-dried at room temperature for 60 minutes. A fluorosilicone rubber compound prepared by blending 100 parts of fluorosilicone rubber XE-24-701V (trade name, manufactured by Toshiba Silicone Co., Ltd.) with 0.5 part of vulcanizing agent TC-8 (trade name, manufactured by Toshiba Silicone Co., Ltd.) was bonded to each of the above-obtained primed metal plates by press-molding the fluorosilicone rubber compound along with each metal plate at 170° C. for 10 minutes in accordance with the method of preparing test pieces as provided for in JIS K 6301 8.3 "90° Peel Test for Rubbers Bonded to Metal Plates". Thus, test pieces were prepared. These test pieces were subjected to 180° peel test by means of the same testing machine (Autograph; crosshead speed 50 mm/min; temperature 25° C.) as used in Example 1. The results obtained are shown in Table 4.

COMPARATIVE EXAMPLES 4 AND 5

Peel test was conducted in the same manner as in Example 10 except that the amount of (N-methacryl)-γ-aminopropyltrimethoxysilane added to the primer com- While the invention has been described in detail and with reference to specific examples thereof, it will be apparent to one skilled in the art that various changes and modifications can be made therein without departing from the spirit and scope thereof.

What is claimed is:

1. A primer composition comprising
   (A) 100 parts by weight of a polyorganosiloxane represented by formula (I):

wherein R$^1$ represents a substituted or unsubstituted monovalent hydrocarbon group, 10 to 50 mol% of the hydrocarbon groups of R$^1$ being perfluoroalkyl and 0.01 to 10 mol% of the hydrocarbon groups of R$_1$ being vinyl, and a is a number of from 1.98 to 2.01, and which has a viscosity as measured at 25° C. of 1,000,000 cSt or more;
   (B) 5 to 100 parts by weight of a silica filler;
   (C) 0.5 to 50 parts by weight of a compound represented by formula (II):

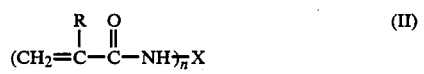

wherein X represents an organosilicon-containing group or a hydrocarbon-containing group, R represents methyl or hydrogen, and n is an integer of 1 or larger; and
   (D) an organic solvent.

2. A primer composition as claimed in claim 1, wherein the substituted or unsubstituted monovalent hydrocarbon group is an alkyl group, an aryl group, an aralkyl group, a vinyl group, or those groups wherein part or whole of hydrogen atoms are substituted with a halogen atom.

3. A primer composition as claimed in claim 1, wherein the substituted or unsubstituted monovalent hydrocarbon group is methyl, ethyl, propyl, butyl, phenyl, tolyl, β-phenylethyl, vinyl, 3,3,3-trifluoropropyl or 3-chloropropyl.

4. A primer composition as claimed in claim 1, wherein the perfluoroalkyl is 3,3,3-trifluoropropyl or 3,3,4,4-pentafluorobutyl.

5. A primer composition as claimed in claim 1, wherein the polyorganosiloxane has a viscosity measured at 25° C. of 2,000,000 to 7,000,000 cSt.

6. A primer composition as claimed in claim 1, wherein the amount of the silica filler is 10 to 50 parts by weight.

7. A primer composition as claimed in claim 1, wherein the silica filler is a reinforcing silica having a specific surface area of 50 m²/g or more, or a non-reinforcing silica.

8. A primer composition as claimed in claim 1, wherein the silica filler is treated with a surface treating agent to make the surface thereof hydrophobic.

9. A primer composition as claimed in claim 1, wherein the amount of the compound of component (C) is 2 to 30 parts by weight.

10. A primer composition as claimed in claim 1, wherein the compound of component (C) is N-methylolacrylamide, N,N-dimethylacrylamide, diacetoneacrylamide, N,N'-methylenebisacrylamide, N-methylolmethacrylamide, (N-methacryl)-γ-aminopropyltrimethoxysilane,

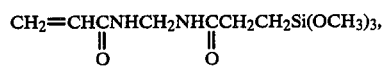

or partial condensates of those alkoxysilanes.

11. A primer composition as claimed in claim 1, wherein the organic solvent is acetone, ethyl acetate, butyl acetate, cyclohexanone, tetrahydrofuran, methyl ethyl ketone or methyl isobutyl ketone.

12. A primer composition as claimed in claim 1, wherein the amount of the organic solvent is 200 to 800 parts by weight per 100 parts by weight of component (A).

* * * * *